United States Patent [19]

Peterson

[11] Patent Number: 4,852,337
[45] Date of Patent: Aug. 1, 1989

[54] METHOD AND APPARATUS FOR REMOVING AQUATIC PLANTS

[76] Inventor: Thomas K. M. Peterson, 23 Stoney Point Rd., Courtland, Minn. 56021

[21] Appl. No.: 90,855

[22] Filed: Aug. 31, 1987

[51] Int. Cl.$^4$ ............................................. A01D 7/10
[52] U.S. Cl. ............................................. 56/8; 56/9;
    56/400.17; 56/400.07; 172/720
[58] Field of Search ................. 56/8, 9, 229, 400.01,
    56/400.05, 400.06, 400.07, 400.08, 400.09,
    400.16, 400.21; 172/44, 698, 720, 611

[56] References Cited

U.S. PATENT DOCUMENTS

| | | | |
|---|---|---|---|
| 623,708 | 5/1899 | Ensley | 56/400.21 |
| 3,633,678 | 1/1972 | Ledue | 172/720 |
| 3,749,177 | 7/1973 | Keyser et al. | 172/720 |
| 4,157,119 | 6/1979 | Litchfield | 172/611 |
| 4,224,786 | 9/1980 | Langlin et al. | 56/400.01 |

FOREIGN PATENT DOCUMENTS

| | | | |
|---|---|---|---|
| 2519234 | 11/1976 | Fed. Rep. of Germany | 56/400.07 |
| 1184440 | 7/1959 | France | 56/8 |
| 88242 | 1/1937 | Sweden | 56/400.08 |

Primary Examiner—John Weiss
Attorney, Agent, or Firm—Henry C. Kovar

[57] ABSTRACT

A method of and rake for removal of aquatic plants; the method has the steps of pulling a rake over an underwater bottom, engaging aquatic plants with flexible, resilient teeth and a flexible, resilient filament strung between the teeth, pulling the plant out of the bottom with the filament and distributing stress among the teeth through the filament when the rake snags an immovable obstruction; the rake has a cross bar, a plurality of elongate flexible and resilient teeth attached to the bar, and a flexible and resilient high tensile strength filament strung to and between all of the teeth. The filament pulls out plants and distributes stress among the teeth. An improved rake tooth has structure for holding a transverse filament adjacent a tip of the tooth.

5 Claims, 2 Drawing Sheets

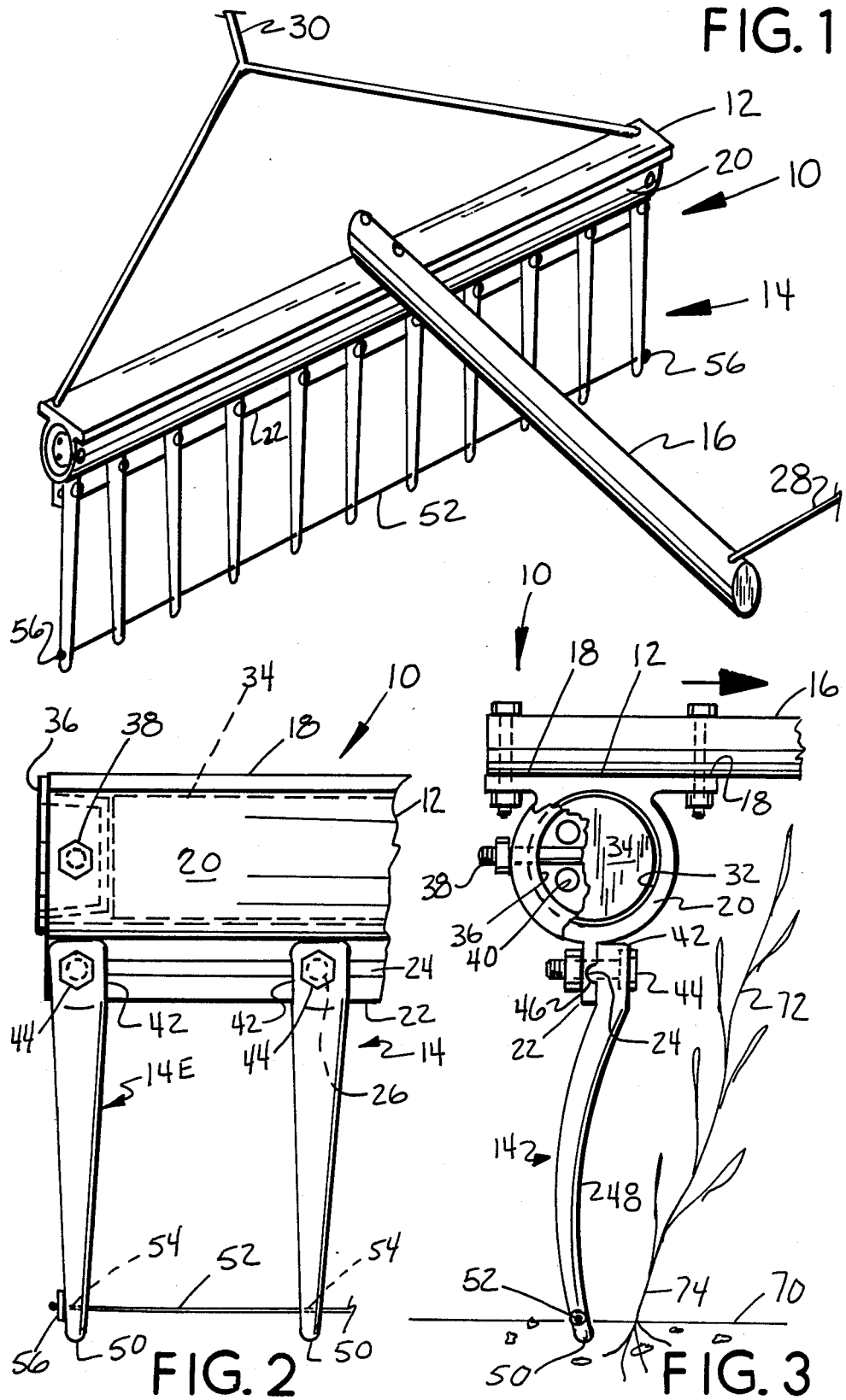

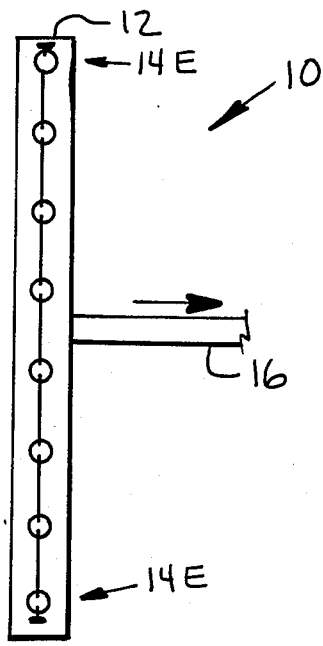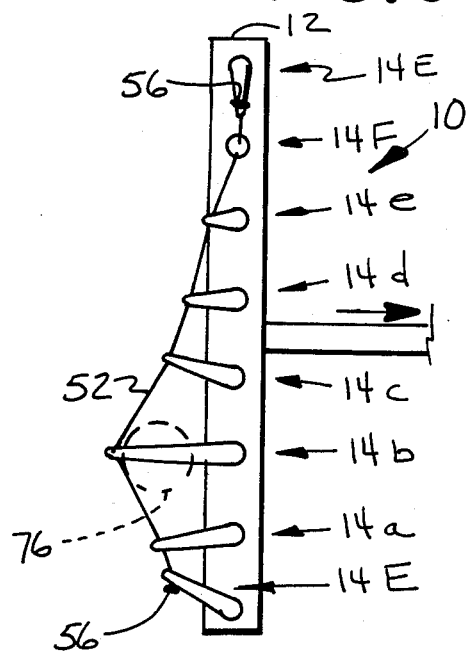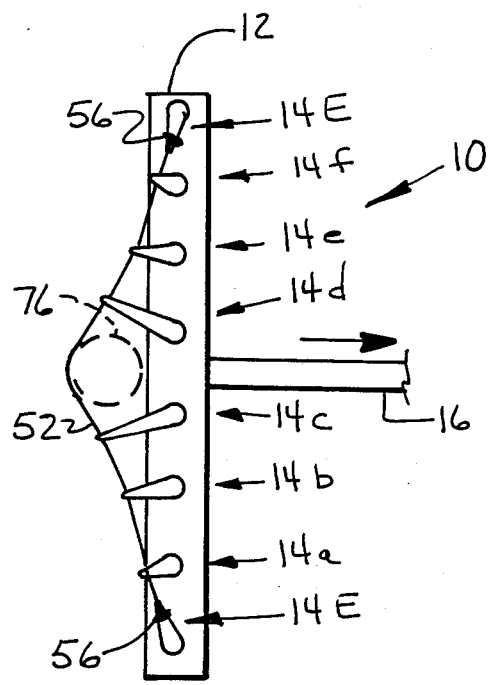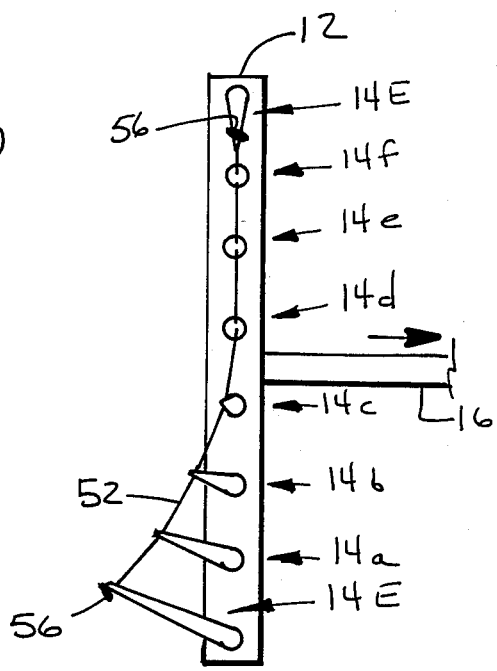

४,८५२,३३७

METHOD AND APPARATUS FOR REMOVING AQUATIC PLANTS

BACKGROUND OF THE INVENTION

1. Field of the Invention

This invention pertains to a method of and apparatus for removal of bottom growing aquatic plants utilizing a rake type device.

2. The Prior Art

Removal of aquatic weeds growing from the bottom is a problem for waterfront property owners and users. Chemicals have been used for weed removal, but are no longer acceptable.

The most often used weed removing tool is a common rigid yard rake, of the type available in most hardware and lawn and garden retailers. These rakes have short, rigid tines and a rigid transverse bar atop of the tines.

Another often used device is an old box spring. These are typically hooked to a boat and pulled over weed growth. Not many people want to keep an old box spring around their lake property and it is difficult to use. It does not do a particularly good job of pulling out weeds.

Golf course rakes, i.e. rakes for sand traps, have been used to remove weeds. These rakes have been weighted for removal of weeds.

Sickle section cutters have also been used. The waterfront property owner has procured a sawtooth blade from an agricultural hay cutter, and attaches a line to each end and pulls it through the weeds. The weeds are cut off and float to the surface and are not brought in. A sickle blade is also a potentially dangerous device to store and use.

V-type cutters with sharp blades are available for cutting of aquatic weeds. However, distributors and retailers are afraid of personal injury and product liability claims, and these devices are not easily marketed.

Basket type devices combined with cutters and pull links also are available. These devices are relatively heavy, bulky, difficult to use, unwanted and difficult to sell.

Chemicals are not a good long-range solution because the chemically killed plants sink to the bottom to decay and compound muck problems. Also, a chemical may be effective on one plant variety and ineffective on other varieties. Weed cutters take only the tops and the roots remain.

The only effective method is to remove the weeds at their source, which is the roots.

OBJECTIVES OF THE INVENTION

It is an object of the invention to provide an improved and economical method of and apparatus for removal of aquatic plants, without the use of chemicals.

It is an object of the present invention to provide an improved method of and apparatus for removal of aquatic plants, utilizing a rake type structure.

It is an object of the present invention to provide an improved rake type apparatus for removal of aquatic plants.

It is an object of the present invention to provide an improved tooth for a rake type apparatus for removal of aquatic plants.

It is an object of the present invention to provide an improved method and apparatus for uprooting, gathering and removing aquatic plants.

It is an object of the present invention to provide an underwater plant rake having improved structure for ballasting.

It is an object of the present invention to provide an underwater aquatic weed rake in which resilient teeth distribute their stress loads to each other.

SUMMARY OF THE INVENTION

A method of removing aquatic plants from an underwater bottom has the steps of lowering a rake with flexible and resilient teeth onto the bottom, pulling the rake over the bottom and engaging and removing the plants therefrom, and distributing bending stress in any one tooth to other of the teeth upon engagement of the rake with underwater objects sufficiently resistant to bend the teeth.

A method of removing aquatic plants from underwater has the steps of lowering rake with teeth onto the bottom, pulling the rake over the bottom and into and through plants growing on the bottom, pulling a transverse filament along with the rake and adjacent to the bottom, and transversely engaging upright stalks of the plant with the filament and removing the plant from the bottom with the filament.

An improved underwater aquatic plant rake has a transverse bar, structure for pulling the rake underwater, a plurality of flexible and resilient teeth, and stress distributing structure for distributing stress in any one tooth to other of the teeth.

An improved underwater aquatic plant rake has an elongate transverse bar, structure for pulling the bar over an underwater bottom, a plurality of teeth mounted on the bar with each tooth having a tine, and a filament strung between the tines; the filament is for engaging the plants adjacent the bottom and pulling the plant out of the bottom.

An improved underwater aquatic plant rake has an elongate transverse bar, structure for pulling the bar over an underwater bottom, a plurality of teeth mounted on the bar, elongate and transverse ballast holding structure in the bar, and a closure for retention of ballast in the holding structure.

An improved tooth for an aquatic plant rake having a plurality of teeth, has mounting structure, an elongate flexible and resilient tine extending from the mounting structure to a tip, and structure adjacent to the tip for operatively and resiliently movable connection of the tip end of the tine to the tip end of an adjacent and like tooth.

An improved tooth for an aquatic plant rake has mounting structure, an elongate cantilevered tine extending from the mounting structure to a distal tip, and structure on the tine and adjacent to the tip for pulling a transverse filament through the water and adjacent to an underwater bottom.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view looking downward on the preferred embodiment of a rake for removal of aquatic plants, according to the present invention;

FIG. 2 is a detail elevational view of the left end of the structure of FIG. 1;

FIG. 3 is an end view of the structure of FIG. 1;

FIG. 4 is a plan view of the bottom of the structure of FIG. 1 with the structure of FIG. 1 inverted;

FIG. 5 is a plan view of the bottom as in FIG. 4, shown with bending of the teeth due to an object engaging the third tooth up;

FIG. 6 is a plan view of the bottom as in FIG. 4, shown with bending of the teeth due to an object engaging the filament; and FIG. 7 is a plan view of the bottom as in FIG. 4, shown with bending of the teeth due to an object engaging the bottom tooth of the view.

DESCRIPTION OF THE PREFERRED EMBODIMENT

A new and improved rake for removal of aquatic plants is shown in FIG. 1 and is generally indicated by the numeral 10. The rake 10 has an elongate transverse bar 12, a plurality of new and improved rake teeth 14, and a handle 16 for pulling the rake 10 over an underwater bottom of a lake, river or other body of water.

The rake bar 12 is preferably an elongate length of extended aluminum section. A preferred length for a rake bar 12 to be operated and pulled by one person is about three feet long. The cross-section of the bar 12 is shown in FIG. 3. The bar has a top plate 18 to which is bolted the handle 16, a tubular section 20 which is preferably closed, and a downward extending leg 22. The leg 22 has an elongate transverse groove 24. A plurality of spaced apart apertures 26 are provided along the length of the leg 22.

The handle 16 is preferably a length of hollow and open ended aluminum tubing. A pull rope 28 is connected to the rake 10 and through the handle 16 for pulling the rake during plant removal.

A back pull rope 30 is attached to the back corners of the bar 12. The back rope 30 is typically manipulated by a second person who back pulls the rake 10 from a boat, dock or raft and pulls the rake 10 outward and away from shore, enabling the user of the rake 10 to pull the primary rope 28 and pull the rake 10 toward shore during plant removal.

Within the tubular section 20 of the bar 12 is a ballast chamber 32 which may contain a ballast weight 34. The ballast chamber 32 is closed on each end by a plastic cap 36 held in by a cross bolt 38. The plastic caps 36 are perforate and have apertures 40 for flow of water into and out of the ballast chamber 32.

Each tooth 14 has a mounting end 42 formed by a hub through which a mounting bolt 44 is extended for securement of the tooth 14 to the leg 25 of the bar. Each mounting end 42 preferably has a key 46 for indexing the tooth 14 on and to the bar leg 22 so that the tooth 14 cannot swivel around the bolt 44. The tooth key 46 inserts into the groove 24. Each tooth 14 has an elongate cantilevered tine 48 extending from the mounting end 42 to a tooth tip 50.

Each tooth 14 is preferably made of a high physical property plastic, such as acetal, and is quite flexible and resilient.

An important feature of this invention is a transverse filament 52 which i strung between the teeth 14. Each tooth 14 has structure for holding the transverse filament 52, an the preferred holding structure is a transverse filament aperture 54 in the tine 48. The filament aperture 54 is adjacent to and spaced just upward of the tine tip 50. A preferred total length of the tooth 14, as measured from the centerline of the bolt 44 is about eight inches, and the filament 52 and filament apertures 54 are preferably about ⅜ to ½ inch above the tine tip 50. The filament 52 is of relatively small diameter, a diameter of less than ⅛ inch has been found quite satisfactory Preferred material for the filament are micro miniature stainless steel cable encased in a plastic sheath such as the cable used for fishing leaders, or alternatively the plastic string used in motorized weed trimmers works well. The filament 52 is connected to and threaded through every one of the teeth 14. The ends of the filament 52 are fastened to the rake 10. The preferred fastening is a tie or crimp of an appropriate type 56 to and on the outside of each end tooth 14E. The filament 52 could be extended up to and have its ends fastened to the bar 12. This type of tie 56 and fastening prevents the filament 52 from being pulled out of the teeth. The filament apertures 54 are larger than the filament 52 and the filament 52 is free to slide transversely in all of the filament apertures 54. The filament 54 is preferably of a very flexible configuration so that it will resiliently deflect when engaging plants, debris, and obstacles. The filament 52 may bend very easily and may be of an inclosed cable which does not stretch in length, or be a completely plastic filament 52 that will stretch in length.

In the practice of the method of the present invention and in the use of the rake 10, the person who uses the rake 10, (hereinafter referred to as the "user") gets the rake 10 disassembled in a box from a retailer. The handle 16 may be packed and shipped in the ballast chamber 32, the handle 16 and teeth 14 are bolted to the bar 12. The pull rope 28 is attached. The back pull rope 30 if attached if it is needed. The flexible filament 52 is strung to the teeth tines 48 and is fastened to the end teeth 14E.

The ballast chamber 32 is either open or is opened by removal of one of the caps 36. The ballast chamber 32 is diametrically sized to accept therein one inch pipe or 1¼inch bar stock. Approximate weights of ballast 34 that can be easily and economically placed in the ballast chamber 32 are:

| | |
|---|---|
| Gravel/stones | 3 lbs. |
| 1″ dia. × .040 wall pipe | 5 lbs. |
| 1″ dia. × .080 wall pipe | 6½ lbs. |
| 1″ dia. × .160 wall pipe | 8¼ lbs. |
| 1¼″ dia. solid rod | 11¼ lbs. |

These weights are for a 34″long ballast chamber 32. The user, therefore, can ballast the rake 10 as is appropriate for his intended use and bottom and plant conditions.

The rake 10 can be used in several techniques. It can be pulled to shore while the user is wading, it can be pulled behind a boat, it can be thrown from a dock or shore and retrieved with the pull rope 28, or it can be utilized with a two-man drag system wherein a helper in a boat pulls the rake 10 out with the back pull rope 30 and the user then pulls the rake in with the pull rope 28.

In normal operation of the rake 10, the tine tips 50 dig into and are buried in the underwater bottom 70 and are pulled through the bottom 70. The flexible filament 52 is pulled along immediately adjacent to and preferably right, on and in physical contact with the bottom 70. The filament 52 is pulled by every tooth 14 in evenly spread increments along the length of the filament 52. The bar 12 is pulled along above and spaced from the filament 52. The ballast 34 is adjusted by the user for the most desirable particular configuration. As the rake 10 is pulled into and through underwater plants, such as the individual plant 72 shown, the top of the plant 72 is engaged by the bar 12 and the base of the plant stalk 74 is engaged by the filament 52. The filament 52 pulls on the plant stalk 74 and pulls the plant 72, roots and all, out of the bottom 70. The rake 10 removes the plant 72 and its source, specifically, the roots. The elongate flexible teeth 14 penetrate the bottom 70 to remove vegetation, plant debris, sticks, cans, bottles, plastic bags, rocks and other undesirable matter. The rake 10 contains the plants and debris within the teeth 14 as the rake 10 is pulled to shore. The rake 10 further removes filamentous algae blooms, and chora algae. The removal of the algae and plants can reduce snail concentrations, leeches and other small life forms in the cleared area, which in turn reduces swimmers' itch problems associated with aquatic plants and growth. The principle of pulling the aquatic plants cannot be overemphasized. This method is superior to other methods of aquatic plant control. When the plant's root, stalk and seeds are removed, future regrowth is greatly diminished. Also underwater bottom muck accumulation is reduced by the removal of decaying plant matter which will remain when aquatic plants are chemically killed.

FIG. 4 illustrates the normal configuration and geometry of the rake 10 as it is pulled across an underwater bottom.

FIG. 5 illustrates what happens to the rake 10 when it engages an underwater obstacle 76 having significant resistance to be moved. Specifically, tooth 14b has engaged a rock, a metal post in the bottom 70 or who knows what; regardless, it is an object 76 that will not move, at least not with the rake 10. The flexible tooth 14b is bent rearward, pulling the filament 52 with it. As the filament 52 is pulled by the tooth 52, the filament 52 is in pure tension. The filament 52 pulls back and bends the immediately adjacent teeth 14a, 14c and pulls both of the end teeth 14E inward. The second adjacent tooth 14d will also be bent if tooth 14b deflects far enough. This mechanism resiliently distributes stress from the primary loaded tooth 14b at least to the adjacent teeth 14a, 14c and to both of the end teeth 14E, and in severe loading, to the other teeth 14d, 14e also. The individual tooth 14b engaging the fixed object 76 does not have to take all of the load and is not bent beyond a resilient deflection. As the flexible tooth 14b is bent rearward, it forms into an angle which will cam the rake 10 up and over the fixed object 76.

FIG. 6 illustrates what happens when a fixed object 76 goes between teeth 14 and engages the flexible filament 52. The filament 52 is pulled back as shown and the most adjacent teeth, 14c, 14d are both pulled back and they both also bend outward. The second adjacent teeth 14b, 14e are likewise bent but to a lesser degree. The outer teeth 14E are both pulled in and provide the resilient elastic tensile loading of the filament 52 to resist the obstacle 76.

FIG. 7 illustrates what happens when an end tooth 14E is snagged. As shown, the lower end tooth 14E bends back and is pulled inward by the filament 52. The most adjacent tooth 14a and second adjacent tooth 14b are correspondingly loaded and bent by the stressed filament 52 and the opposite (upper) end tooth 14E is pulled inward by the tensile loading on the filament 52.

The filament 52 is normally loose and floppy in all of the teeth 14, and none of the teeth 14 have a static load from the filament 52. However, when an obstacle 76 is engaged, the filament 52 is loaded under tensile stress and the stress load is fed and distributed to several of the teeth 14. The teeth 14 are all flexible and resilient and the entire rake 10 will conform to the obstacle 76. Tooth 14 breakage and/or yielding deflection is prevented. The teeth 14 and filament 52 are not subject to corrosion. All, i.e. each and every, teeth 14 are connected together by the filament 52 for stress distribution.

This new and improved method of removing aquatic plants and new and improved rake are very useful and effective and valuable to waterfront users, and also to the general public and the environment because of no further need for chemicals and because of efficient and useful disposition of removed plants. The removed plants are quite useful as fertilizer and compost material.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A method of removing aquatic plants from an underwater bottom, comprising the steps of:
   (a) lowering a rake to the underwater bottom, with a plurality of teeth on the rake each having an individually suspended flexible and resilient tine pointed downward toward and into the bottom;
   (b) pulling the rake over the bottom and into and through aquatic plants growing from the bottom with the tines engaging the bottom and removing the plants therefrom;
   (c) distributing bending stress in any one said tooth to other of said teeth upon engagement of the rake with an underwater object sufficiently resistant to bend any one of said teeth, said stress distributing being done with a relatively flexible and resilient filament extending transversely between and loosely through each tip of all said tines, said filament having its ends positively fastened to the rake on the outside of each end said tooth; and
   (d) resiliently pulling both of said end teeth toward each other during said stress distribution with the filament and thereby providing a tensile tautness in the filament to resist the object.

2. A method of removing aquatic plants from an underwater bottom, comprising the steps of:
   (a) lowering a rake to the underwater bottom, with a plurality of teeth on the rake each having an individually suspended flexible and resilient tine pointed downward toward and into the bottom;
   (b) pulling the rake over the bottom and into and through aquatic plants growing from the bottom with the tines engaging the bottom and removing the plants therefrom;
   (c) distributing bending stress in any one said tooth to other of said teeth upon engagement of the rake with an underwater object sufficiently resistant to bend any one of said teeth, said stress distributing being done with a relatively flexible and resilient filament extending transversely between and loosely through each tip of all said tines, said filament having outer ends positively fastened to the rake on the outside of each opposite end said tooth; and (d) resiliently pulling and bending one said end tooth toward the opposite and other said end tooth upon engagement of said other end tooth with the object, and distributing the stress between the said opposite end teeth upon the deflection of either of them.

3. An improved underwater aquatic plant rake, comprising (a) a rigid transverse and elongate rake bar;

(b) means for pulling said bar over an underwater bottom while said bar is submerged;

(c) a plurality of relatively flexible and resilient plastic rake teeth each of which is individually mounted to said bar;

(d) stress distributing means connected to all of said teeth for distributing bending stress in any one of said teeth to other of said teeth;

(e) said stress distributing means being a flexible and resilient filament loosely threaded through an individually cantilevered tine tip of each said teeth, said filament being transversely movable with respect to the central of said teeth;

(f) fastening means fastening each end of the filament to the rake on the outside of each end said teeth, said end teeth being resiliently deformable toward each other for stress distribution and tensile loading of the filament during deflection of any of said teeth.

4. The rake of claim 3, in which said rake bar is an extruded section bar having a tubular section atop of a downward extending leg, said tubular section being receptive of a ballast weight from the group of (1) an elongate straight length of standard side iron pipe, of at least one inch diameter, (2) a similarly sized length of standard diameter solid metal bar, said leg having an extruded groove therein receiving a similarly shaped index key in each of said teeth.

5. An improved all plastic tooth for an aquatic plant rake having a plurality of teeth comprising (a) key structure for being mounted to a rake frame;

(b) an elongate flexible and resilient cantelevered tine extending from said key structure to a tip;

(c) a transverse aperture through said tine and adjacent to said tip for operative and resiliently movable connection of the tip end of the tine to the tip end of an adjacent tine on an adjacent and like tooth by a transverse filament threaded through the aperture;

(d) said key structure and said aperture being on opposite ends of the tooth.

* * * * *